US010638891B2

(12) United States Patent
Mogadati et al.

(10) Patent No.: US 10,638,891 B2
(45) Date of Patent: May 5, 2020

(54) CONFIGURABLE PAPER ROLL DISPENSER SENSOR DEVICE

(71) Applicant: DISH Network L.L.C., Englewood, CO (US)

(72) Inventors: Sunil Mogadati, Greenwood Village, CO (US); Ezekiel Anders, Englewood, CO (US); Andrew Zartman, Thornton, CO (US); Raghu Vuppuluri, Parker, CO (US); Melinda Yost, Westminster, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 16/040,548

(22) Filed: Jul. 20, 2018

(65) Prior Publication Data

US 2020/0022540 A1 Jan. 23, 2020

(51) Int. Cl.
*A47K 10/38* (2006.01)
*G01B 21/08* (2006.01)
*G01B 21/16* (2006.01)

(52) U.S. Cl.
CPC .............. *A47K 10/38* (2013.01); *G01B 21/08* (2013.01); *G01B 21/16* (2013.01); *A47K 2010/389* (2013.01)

(58) Field of Classification Search
CPC .. A47K 10/38; A47K 2010/389; G01B 21/08; G01B 21/16
USPC .................................................. 700/231–244
See application file for complete search history.

(56) References Cited

U.S. PATENT DOCUMENTS

| 10,213,068 | B2* | 2/2019 | Diamond | A47K 10/34 |
| 2008/0245922 | A1* | 10/2008 | Fellhoelter | A47K 10/36 |
| | | | | 242/554.6 |
| 2009/0198373 | A1* | 8/2009 | Mok | A47K 10/36 |
| | | | | 700/231 |
| 2012/0118909 | A1* | 5/2012 | Yaros | A47K 10/38 |
| | | | | 221/46 |
| 2014/0367401 | A1 | 12/2014 | Stralin et al. | |
| 2016/0227970 | A1* | 8/2016 | Diamond | B65H 43/00 |
| 2016/0262580 | A1* | 9/2016 | Fellhoelter | A47K 10/3687 |
| 2018/0263435 | A1* | 9/2018 | Osborne, Jr. | A47K 10/38 |
| 2019/0142229 | A1* | 5/2019 | Diamond | A47K 10/34 |
| | | | | 700/236 |
| 2019/0151577 | A1* | 5/2019 | Jung | A61M 15/008 |

* cited by examiner

*Primary Examiner* — Michael Collins
(74) *Attorney, Agent, or Firm* — Kilpatrick Townsend & Stockton LLP

(57) ABSTRACT

Various arrangements are presented of a paper roll sensing device that can be installed within a paper roll dispenser. The paper roll sensing device may include a housing, a wireless transceiver, and a time-of-flight sensor. The time of flight sensor may measure a distance from the time-of-flight sensor to a target region. The paper roll sensing device may include one or more processors, located within the housing that communicates with the wireless transceiver and the time-of-flight sensor. The paper roll sending device may include a fastener that permits the housing to be attached to a location within a paper roll dispenser such that the time-of-flight sensor is pointed at a paper roll, wherein the target region is a portion of the paper roll.

18 Claims, 6 Drawing Sheets

CONFIGURABLE PAPER ROLL DISPENSER SENSOR DEVICE

BACKGROUND

Everyone knows the frustration of washing their hands in a public restroom and the paper towel dispenser being empty. Frequently this occurs because a janitor only periodically checks the supply of paper towels within the paper towel dispenser and/or a sudden influx of bathroom users was unanticipated. If the paper towel dispenser's supply of paper towels becomes exhausted, the janitor may not be aware of the need for refilling until a later visit to the bathroom, possibly hours or even days later.

SUMMARY

Various embodiments are described related to a paper roll sensing device. In some embodiments, a paper roll sensing device is described. The device may include a housing. The device may include a wireless transceiver located within the housing. The device may include a time-of-flight sensor, located within the housing, that measures a distance from the time-of-flight sensor to a target region. The device may include one or more processors, located within the housing that communicates with the wireless transceiver and the time-of-flight sensor. The device may include a fastener that permits the housing to be attached to a location within a paper roll dispenser such that the time-of-flight sensor may be pointed at a paper roll. The target region may be a portion of the paper roll based on the location.

Embodiments of such a device may include one or more of the following features: The one or more processors may be configured to perform a calibration procedure that may include the one or more processors being configured to determine a first distance to a first paper roll based on a first distance measurement made using the time-of-flight sensor. The one or more processors may be configured to determine a second distance to a second paper roll based on a second distance measurement made using the time-of-flight sensor. The second paper roll may have more paper attached than the first paper roll. The one or more processors may be configured to establish a calibration metric based on the first distance and/or the second distance. A first amount of rolled paper on the first paper roll may represent an amount of paper at which the one or more processors may cause the wireless transceiver to transmit a notification of a paper roll replacement being needed to a cloud-based server system. The one or more processors may be further configured to retrieve a device identifier of the paper roll sensing device. The one or more processors may be further configured to receive a distance measurement from the time-of-flight sensor. The one or more processors may be further configured to determine that the paper roll requires replacement based on the distance measurement and the calibration procedure. The one or more processors may be further configured to cause the wireless transceiver to transmit an indication that the paper roll requires replacement and the device identifier. The one or more processors may be further configured to retrieve a device identifier of the paper roll sensing device. The one or more processors may be further configured to receive a distance measurement from the time-of-flight sensor. The one or more processors may be further configured to determine an amount of dispensable paper remaining on the paper roll based on the distance measurement and the calibration procedure. The one or more processors may be further configured to cause the wireless transceiver to transmit the amount and the device identifier. The fastener may be positioned within the paper roll dispenser such that when less than a threshold amount of paper may be present on the paper roll, the target region may be a portion of an inner surface of a door of the paper roll dispenser. The paper roll sensing device may further include one or more processors configured to perform a calibration process comprising measuring a closed-door distance to the portion of the inner surface of the door of the paper roll dispenser. The paper roll sensing device may further include one or more processors configured to receive a distance measurement from the time-of-flight sensor. The device may further include one or more processors configured to determine the distance measurement may be greater than the closed-door distance. The device may further include one or more processors configured to cause the wireless transceiver to transmit an indication that the door may be open and a device identifier to a remote server system. The wireless transceiver may be configured to communicate via a narrowband Internet of Things (NB-IoT) network. The fastener may be an adhesive.

In some embodiments, a method for using a paper roll sensing device is described. The method may include fastening the paper roll sensing device within a paper roll dispenser such that a time-of-flight sensor may be pointed at a paper roll. The method may include measuring, using the time-of-flight sensor of the paper roll sensing device, a distance from the time-of-flight sensor to a target region. The method may include transmitting, using a wireless transceiver of the paper roll sensing device, an indication of an amount of paper remaining on the paper roll dispenser.

Embodiments of such a method may include one or more of the following features: The method may include performing, by the paper roll sensing device, a calibration process that includes determining a first distance to a first paper roll based on a first distance measurement made using the time-of-flight sensor. The calibration process may include determining a second distance to a second paper roll based on a second distance measurement made using the time-of-flight sensor. The second paper roll may have more paper attached than the first paper roll. The calibration process may include establishing a calibration metric based on the first distance and/or the second distance. Transmitting the indication of the amount of paper remaining on the paper roll dispenser may be performed in response to the first distance of the calibration process or greater being measured. The method may further include retrieving, by the paper roll sensing device, a device identifier of the paper roll sensing device. The method may further include receiving, by the paper roll sensing device, a distance measurement from the time-of-flight sensor. The method may further include determining, by the paper roll sensing device, that the paper roll requires replacement based on the distance measurement and the calibration process. The method may further include causing, by the paper roll sensing device, the wireless transceiver to transmit an indication that the paper roll requires replacement and the device identifier. The method may further include retrieving, by the paper roll sensing device, a device identifier of the paper roll sensing device. The method may further include receiving, by the paper roll sensing device, a distance measurement from the time-of-flight sensor. The method may further include determining, by the paper roll sensing device, an amount of dispensable paper remaining on the paper roll based on the distance measurement and the calibration process. The method may further include causing, the wireless transceiver of the paper roll sensing device, to transmit an indication of the amount and the device identifier. The paper roll sensing device may be fastened within the paper roll dispenser such that when less than a threshold amount of paper may be present on the paper roll, the target region may be a portion of an inner surface of a door of the paper roll dispenser. The method may further include measuring, by the paper roll sensing device, a closed-door distance to the portion of the inner surface of the door of the paper roll dispenser. The method may further include measuring, by the paper roll sensing device, a distance measurement using the time-of-flight sensor. The method may further include determining, by the paper roll sensing device, the distance measurement may be greater than the closed-door distance. The method may further include causing, by the wireless transceiver of the paper roll sensing device, to transmit an indication that the door may be open and a device identifier to a remote server system. Transmitting the indication of the amount of paper remaining on the paper roll dispenser may be performed via a narrowband Internet of Things (NB-IoT) network. Fastening may be performed using an adhesive.

DETAILED DESCRIPTION

Embodiments detailed herein are directed to a paper roll sensing device (PRSD) that can be installed in a previously-installed paper roll dispenser. The PRSD may be installed as a single unit within the paper roll dispenser such that a sensor of the PRSD is pointed towards a paper roll within the paper roll dispenser. The PRSD may have a time-of-flight sensor and a wireless transmitter such that the amount of paper remaining on the roll is periodically or occasionally reported to a remote server system. A training or calibration process may be performed such that the PRSD can determine distances associated with empty and, possibly, full paper rolls. During a training or calibration process, an installer may insert an empty (or nearly empty) paper roll and may install a full (or nearly full) paper roll to train the PRSD on distances associated with full and empty. The PRSD may measure a distance to each paper roll and, from these two measurements, be able to interpolate a percentage of remaining paper on the paper roll.

In some embodiments, the PRSD may, when the paper roll has less than a threshold amount of paper present on it, be able to sense the state of an access door or panel of the paper roll dispenser. In such arrangements, the PRSD may be able to report to a remote server whether the access door or panel is closed or open. The access door or panel being open may be indicative of tampering or of a janitor being in the process of replacing the paper roll.

The PRSD may communicate with a remote or cloud-based server such that the server can maintain state information for multiple paper roll sensing devices. The server may be integrated with a home assistant device that allows a user to pose a spoken query. In response to the spoken query, a response may be provided using synthesized speech that is indicative of the current state of one or more PRSDs. Similarly, a mobile application may allow the states of multiple PRSDs to be viewed.

The below description focuses on the PRSD dispensing a roll of paper towels. However, it should be understood that similar arrangements may be used for dispensing other types of dispensable products which occasionally are exhausted. For example, a PRSD may be used to monitor the amount of toilet paper, receipt paper, or printer paper remaining on a roll. Other embodiments may be used to monitor the amount of folded paper towels in a folded paper towel dispenser. In still other embodiments, the amount of trash within a trash bin may be measured (in such an embodiment, the smaller the distance measured, the closer the bin may be to full). Further detail regarding these and other embodiments is provided in relation to the figures.

Figure 1:
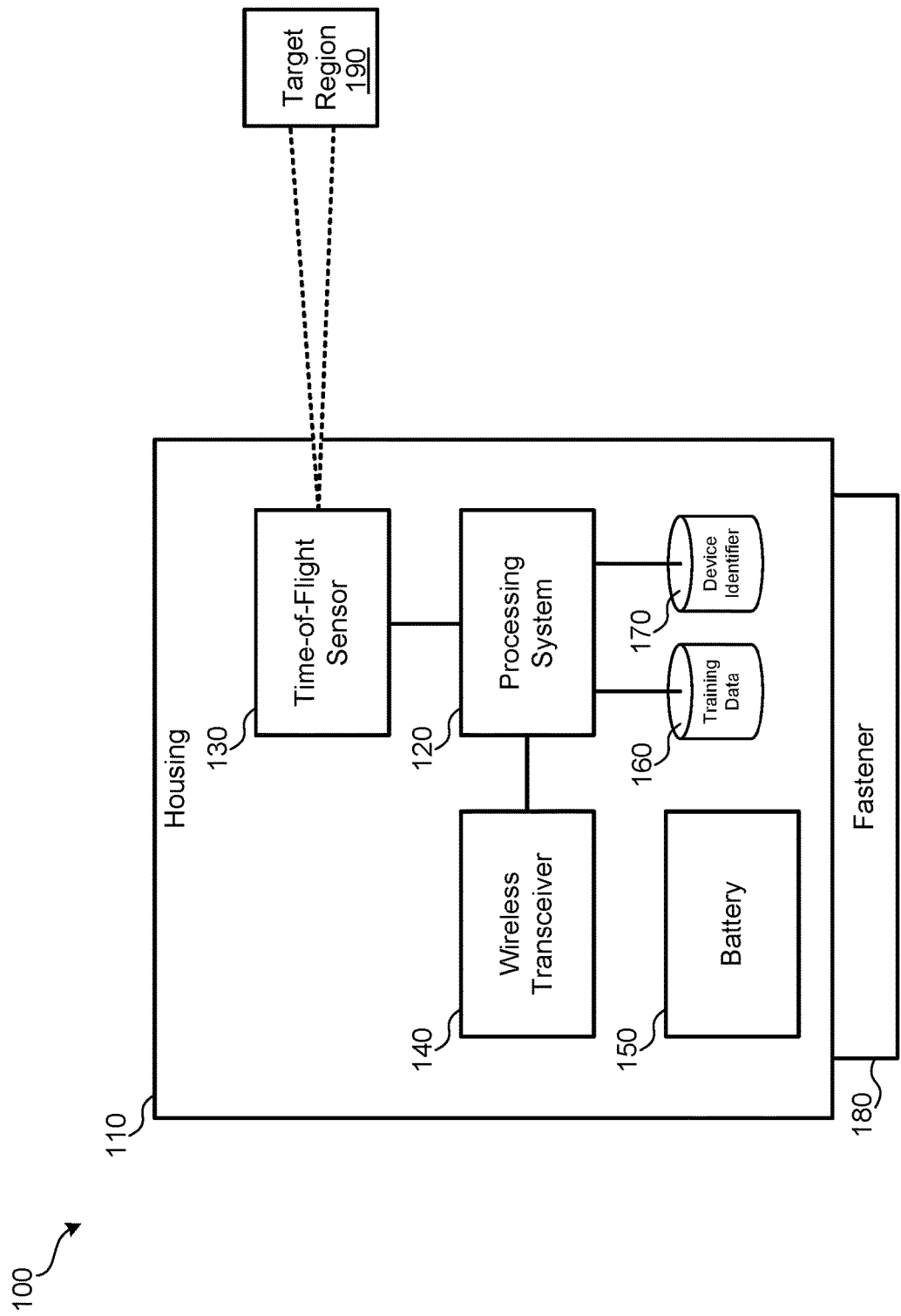
FIG. 1 illustrates a block diagram of an embodiment of a paper roll sensing device.

FIG. 1 illustrates a block diagram of an embodiment of a paper roll sensing device 100. PRSD 100 may include: housing 110; processing system 120; time-of-flight (ToF) sensor 130; wireless transceiver 140; battery 150; training data datastore 160; device identifier 170; and fastener 180. Processing system 120, time-of-flight sensor 130, wireless transceiver 140, battery 150, and one or more non-transitory processor readable mediums may be housed within housing 110. Housing 110 may be attachable to various surfaces using fastener 180. Fastener 180 may allow PRSD 100 to be attached to an internal surface of a paper roll dispenser, such as a paper towel dispenser, that has been previously installed or is yet to be installed in a location. Fastener 180 may be an adhesive (e.g., a pressure sensitive adhesive (PSA)), hook and loop fastener, or some other form of fastener that can hold PRSD 100 to the surface of the paper roll dispenser. In some embodiments, a combination of PSA and a hook and loop fastener is used to allow PRSD 100 to be removably attached to the inner surface of the paper roll dispenser. PRSD 100 may be fastened using fastener 180 to an internal surface of a paper roll dispenser such that time-of-flight sensor 130 is pointed at target region 190 for which distance measurements are to be made. Target region 190 may be on a paper roll such that as paper is dispensed from the roll the distance from time-of-flight sensor 130 to target region 190 changes (e.g., increases).

PRSD 100 may be configured to be installed within various makes and models of paper roll dispensers. Therefore, a user can manually position PRSD 100 and attach it using fastener 180 such that target region 190 properly resides on an installed paper roll and, thus, time-of-flight sensor 130 can measure distance from time-of-flight sensor 130 to the un-dispensed portion of the paper roll. In order to compensate for different types, makes, and models of paper rolls, different types, makes, and models of paper roll dispensers, and variability within the paper roll dispenser as to where PRSD 100 is installed, a learning or calibration process may be performed, such as detailed in relation to FIG. 5.

ToF sensor 130 may transmit sound or light in a particular direction and measure an amount of time to receive the reflected sound or light. The sound or light is incident on target region 190. Target region 190 may reside on a paper roll, possibly until the paper roll is exhausted of paper or nearly exhausted of paper. If the paper roll is exhausted or nearly-exhausted, target region may reside on a door or panel of the paper roll dispenser if PRSD 100 is aligned. This arrangement may be possible if the door or panel is on the front of the paper roll dispenser and PRSD 100 is installed on an inside rear surface of the paper roll dispenser. Such an arrangement may allow for PRSD 100 to determine whether a door or panel is open or closed in addition to an amount of paper remaining on the roll in the paper roll dispenser.

Processing system 120 may include one or more processors. The processors may be general- or special-purpose. In some embodiments, the one or more processors may be ASICs or FPGAs that are configured to perform various functions detailed in relation to FIGS. 5 and 6. Processing system 120 may receive measurements from ToF sensor 130. Processing system 120 may access one or more non-transitory processor-readable mediums, which may store training data datastore 160 and device identifier 170. Processing system 120 may transmit and receive data with wireless transceiver 140.

Wireless transceiver 140 may communicate via one or more wireless communication protocols. Wireless transceiver 140 may communicate with a local Wi-Fi network or some other network to communicate using the IEEE 802.11 communication standard. Wireless transceiver 140 may also communicate using various mesh network or wireless personal area network, such as according to the IEEE's 802.15.4 technical standard. Wireless transceiver 140 may communicate using some other protocol, such as Thread®, Zigbee®, or Z-Wave®. In some embodiments, wireless transceiver 140 may be able to communicate using a narrowband Internet-of-Things (NB-IoT) network. Such a network may permit a low data transmission rate over a large geographic region, thus allowing PRSD 100 to communicate with a remote server system even if a WLAN is not available in the vicinity of PRSD 100.

On-board battery 150 may provide power to the various components of PRSD 100. Since wireless transceiver 140 may communicate little data and ToF sensor 130 may only sporadically make measurements, it may be possible for battery 150 to last a significant amount of time, such as greater than a year, before replacement is needed. In some embodiments, multiple batteries are present. In other embodiments, PRSD 100 may be wired to a fixed power supply, such as an electrical outlet.

Training data datastore 160 may store measurements taken by ToF sensor 130 during a training or calibration phase. Training data datastore 160 may store one or more measurements. Table 1 indicates how such data may be stored in training data datastore 160:

TABLE 1

| Measurement | Distance |
| --- | --- |
| Full Roll | 2.5 cm |
| 90% Depleted Roll | 10.7 cm |
| Empty Roll (distance to door) | 35.0 cm |

Since removal of paper from the roll may result in a linear change in the radius of the roll, processing system 120 may interpolate an amount or percentage of the roll remaining. In other embodiments, such processing may be performed by a remote server system.

Device identifier 170 may store data that uniquely identifies PRSD 100 from other PRSD devices. Device identifier 170 may be a MAC address or some other form of identifier. Device identifier 170 may be included on data transmissions transmitted by wireless transceiver 140.

Figure 2:
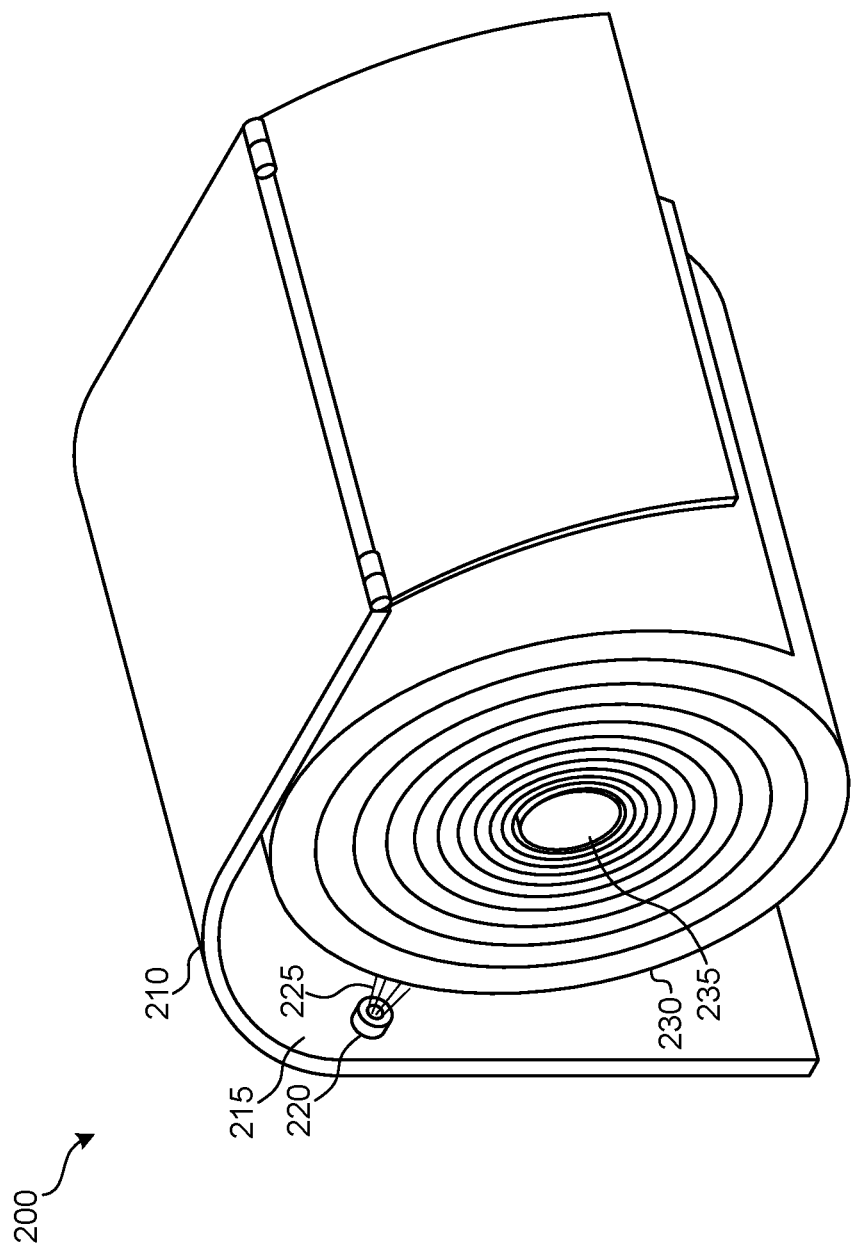
FIG. 2 illustrates an embodiment of a paper roll sensing device installed within a paper roll dispenser.

FIG. 2 illustrates an embodiment 200 of a paper roll sensing device 220 installed within a paper roll dispenser 210. Paper roll sensing device 220 may represent an embodiment of paper roll sensing device 100 of FIG. 1. PRSD 220 may be attached to an inner rear surface 215 of paper roll dispenser 210. A target region on which the beam 225 of light or sound may be focused falls on paper roll 230. Beam 225 may be aimed slightly above or below spindle 235. In other embodiments, beam 225 may be aimed at spindle 235. As paper is dispensed from paper roll 230, the distance measured by PRSD 220 increases.

Figure 3:
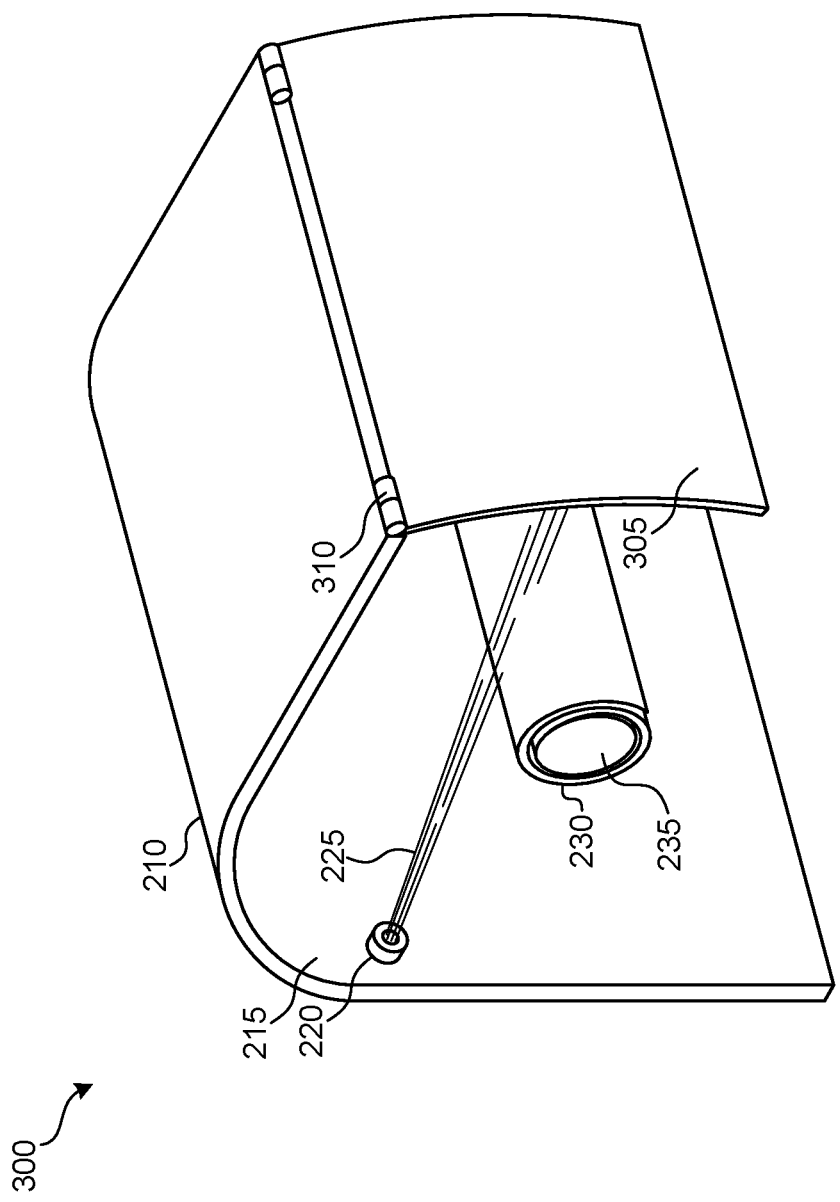
FIG. 3 illustrates an embodiment of a paper roll sensing device installed within a paper roll dispenser.

FIG. 3 illustrates an embodiment 300 of a paper roll sensing device 220 installed within a paper roll dispenser 210. Embodiment 300 may represent embodiment 200 of FIG. 2 after most of paper roll 230 has been dispensed. In embodiment 300, beam 225 is aimed above spindle 235. Beam 225 is now incident on a rear surface of panel 305. Based on the distance measured by PRSD 220 using beam 225, PRSD 220 can determine that panel 305 is in a closed position. Further, based on the distance measured by PRSD 220 using beam 225, PRSD can determine that paper roll 230 is exhausted or nearly exhausted. If the distance measured by PRSD 220 using beam 225 is measured greater than the distance of beam 225 in FIG. 2, it may be determined that panel 305 is in an open or ajar position.

Figure 4:
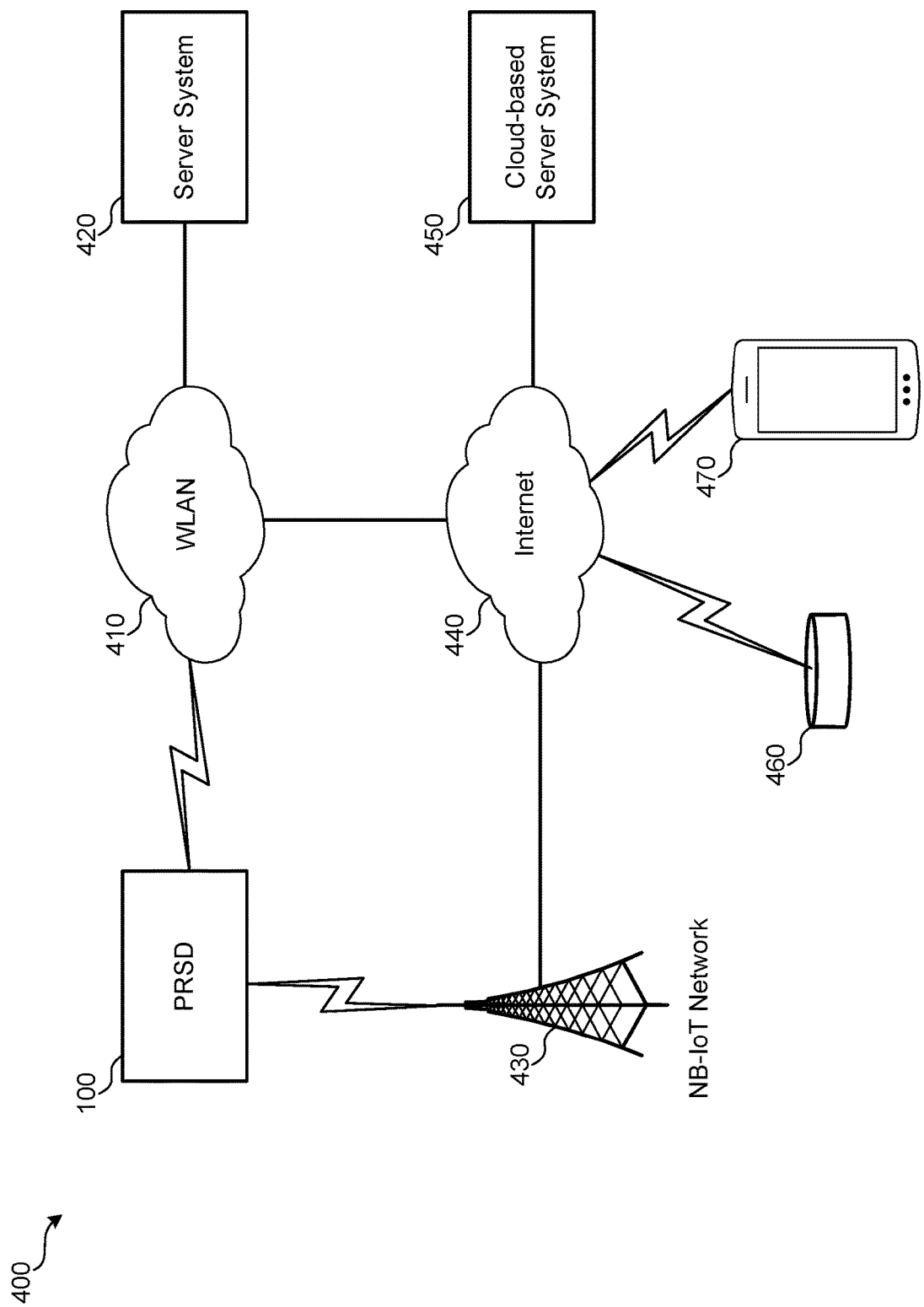
FIG. 4 illustrates an embodiment of a paper roll monitoring system.

FIG. 4 illustrates an embodiment of a paper roll monitoring system 400. Paper roll monitoring system 400 may include: PRSD 100; WLAN 410; server system 420; NB-IoT network 430; Internet 440; cloud-based server system 450; smart home assistant 460; and end-user device 470. PRSD 100 may communicate with WLAN 410 in addition or in alternate to NB-IoT network 430. WLAN 410 may locally route communications to and from PRSD 102 Internet 440 and/or server system 420 connected directly to WLAN 410. While paper roll monitoring system 400 illustrates a single PRSD, it should be understood that this is for illustration purposes only. In a practical embodiment, many PRSDs may be present, such as dozens scattered among different bathrooms and paper towel dispenser devices. Server system 420 may store state information on various PRSDs. This state information may indicate an amount of paper remaining and/or an indication of whether corresponding paper rolls are in need of replacement. Server system 420 may also map various locations to device identifiers of PRSDs. Table 2 illustrates an embodiment of data that server system 420 may store:

TABLE 2

| PRSD Identifier | Location | State |
| --- | --- | --- |
| 230598459 | 1$^{st}$ Floor Men's Bathroom | 75% Full |
| 230958494 | 1$^{st}$ Floor Women's Bathroom | 34% Full |
| 230954954 | 2$^{nd}$ Floor Family Bathroom | Empty, door closed |

State information stored by server system 420 may be updated as various PRSDs transmit state information. WLAN 410 may communicate with Internet 440. In addition or in alternate to server system 420, cloud-based server system 450 may be accessible via Internet 440. In some embodiments, cloud-based server system 450 performs the functions of server system 420. In some embodiments, cloud-based server system 450 may perform various cloud-based functions, such as providing interfaces for accessing information transmitted by various PRSDs to server system 420 or cloud-based server system 450.

Cloud-based server system 450 may permit voice-based inquiries submitted via smart home assistant 460 to be responded to using synthesized voice. For instance, an end-user may ask smart home assistant 460, using speech, "Do any bathrooms require servicing?" Cloud-based server system 450 may interpret this request and may either locally access a database or may access a database stored by server system 420 to determine which, if any, paper rolls require replacement. Smart home assistant 460 may then be used to output a response in the form of synthesized speech. An end-user device, such as end-user device 470, may be used to present a user interface, either via a native application or a web-browser interface, that indicates to an end-user the current state of paper rolls in various locations. For instance, the user interface may present a status of paper rolls for every paper roll dispenser in a particular building. End-user device 470 may be a smartphone, tablet computer, desktop computer, laptop computer, or some other computerized electronic device capable of executing an application or executing a web browser.

NB-IoT Network 430 may communicate with PRSD 100 over a large distance. For example, a single NB-IoT gateway may communicate with devices over many square kilometers. Such an arrangement may eliminate the need for PRSD 100 to communicate locally with WLAN 410. Rather, PRSD 100 may communicate with NB-IoT network 430, which may in turn communicate with Internet 440. PRSD 100 may communicate data with NB-IoT network 430 infrequently. For instance, PRSD 100 may only transmit a message indicative of state when a paper roll has become depleted below a threshold (e.g., 10% remaining). In other embodiments, PRSD 100 may only report state when requested by cloud-based server system 450 or server system 420. In some embodiments, PRSD 100 may communicate more frequently via WLAN 410. For instance, PRSD 100 may transmit an indication of status once per minute when connected with WLAN 410.

Figure 5:
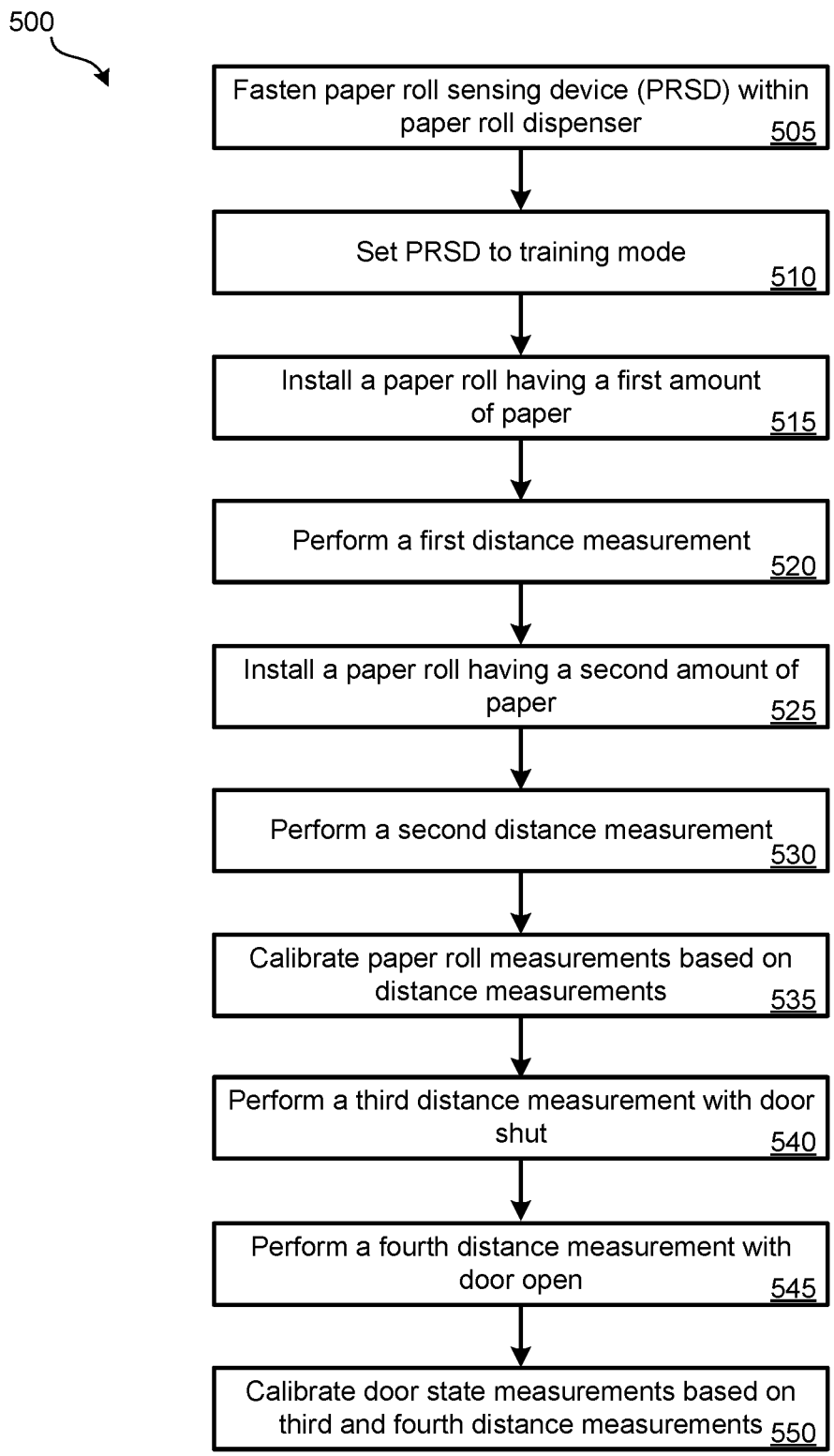
FIG. 5 illustrates an embodiment of a method for training a paper roll sensing device.

Various methods may be performed using the systems and devices detailed in relation to FIGS. 1-4. FIG. 5 illustrates an embodiment of a method 500 for training a paper roll sensing device. Each block of method 500 may be performed by a PRSD, such as PRSD 100. In some embodiments, some blocks of method 500 may be performed using a remote server, such as server system 420 or cloud-based server system 450. For example, in some embodiments, block 535 and/or block 550 may be performed by a remote server system, rather than being performed directly at PRSD 100.

At block 505, the PRSD may be installed within a paper roll dispenser. Block 505 may include a person causing adhesive or other form of fastener to attach the PRSD to a location within the paper roll dispenser such that a time-of-flight sensor is aimed at a location where a paper roll is installed within the paper roll dispenser. In some embodiments, the PRSD may be fastened in a position such that the time-of-flight sensor is aimed towards a dowel or axis on which the paper roll is installed. In some embodiments, the PRSD may be fastened in a position such that the time-of-flight sensor is aimed above, below, or to the side of the dowel or axis on which the paper roll is installed such that if the paper roll is sufficiently exhausted of paper, the time-of-flight sensor may be targeted on a door or panel of the paper roll dispenser. Such an arrangement may permit a state of the door or panel (e.g., open, shut) to be determined when the paper roll is sufficiently exhausted.

Once installed, the PRSD may be sent to a training mode at block 510. Block 510 may be triggered by the PRS the being powered on for a first time. Block 510 may be triggered in response to a command received by the PRSD from a remote server or via its wireless transceiver. A button or other form of user input device present on the PRSD may be actuated in order to trigger the training mode. In some embodiments, an application or interface being executed on an end-user device may be used to interact with the PRSD to initiate the training mode and provide user input during the training mode. In some embodiments, the end-user device may use a local wireless communication protocol, such as Bluetooth, to communicate the PRSD.

At block 515, a first paper roll may be installed within the paper roll dispenser. In some embodiments, this installed paper roll may be representative of an amount of paper at which the installer desires a notification to be output by the PRSD that replacement of a paper roll is needed. In some embodiments, this installed paper roll may be completely exhausted or may have some amount of paper remaining on, such as 10%. In some embodiments, the user may provide input to the PRSD, such as by actuating a button on the PRSD or providing input via a user interface executed by an end-user device, indicating that the paper roll has been installed.

In response to block 515, a first distance measurement may be made by the PRSD using a time-of-flight sensor at block 520. This first distance measurement may determine an amount of distance between the time-of-flight sensor and the first paper roll that has been installed having the first amount of paper.

At block 525, the first paper roll may be removed and a second paper roll may be installed within the paper roll dispenser. In some embodiments, this installed paper roll may be representative of a full or new paper roll. Block 525 may only be necessary if the PRSD is to output an indication of an amount or percent of a paper roll remaining. If only an indication of a roll being empty or exhausted (or nearly empty or exhausted) is to be output, the second distance measurement (and block 525) may not be necessary. In some embodiments, the user may provide input to the PRSD, such as by actuating a button on the PRSD or providing input via a user interface executed by an end-user device, indicating that the second paper roll has been installed.

In response to block 525, a second distance measurement may be made by the PRSD using a time-of-flight sensor at block 530. This first distance measurement may determine an amount of distance between the time-of-flight sensor and the second paper roll that has been installed having the second amount of paper. While in this embodiment of method 500, the first installed roll has less paper than the second, in other embodiments, the first roll may have more paper than the second. In some embodiments, the order may be inconsequential as the PRSD can determine which roll is the full roll and which is empty or near empty (or user input may indicate as such).

At block 535, calibration may be performed either locally by the PRSD or remotely by a server system. The calibration performed at block 535 may use the one or multiple measurements taken at blocks 515 through 530 to extrapolate and/or interpolate a relationship between distances and an amount of paper remaining on a paper roll. For instance, if the first distance measurement was 11 cm (for an empty roll) and the second distance measurement was 1 cm (for a full roll), a measurement of 6 cm may equate to 50% of a roll being remaining. In some embodiments, the PRSD transmits a percentage indication of the amount of paper remaining. In other embodiments, the PRSD transmits a distance which can be used by a remote server in combination with the calibration distances to determine an amount or percentage of the paper roll remaining. In some embodiments, calibration may not be needed if the first distance measurement performed at block 520 is to service a threshold, such that when a larger distances measured then threshold, an indication that a roll is needed to be replaced is transmitted by the PRSD.

In some embodiments, additional calibration steps are performed if the time-of-flight sensor of the PRSD is also used to determine if an access panel or access door of the paper roll dispenser is open or shut when the paper roll has been depleted beyond a certain amount. As previously detailed, once the paper roll has been depleted by more than a certain amount, the target region to which the time-of-flight sensor of the PRSD measures distance they reside on an inner surface of a door or panel of the paper roll dispenser. At block 540, a third distance measurement may be made by the PRSD using the time-of-flight sensor. This third distance measurement may be made while the door or panel is shut and the paper roll is depleted enough such that the target region falls on an inner surface of the panel or door. At block 545, a fourth distance measurement may be made by the PRSD using the time-of-flight sensor. This fourth distance measurement may be made while the door or panel is open and the paper roll is depleted enough such that the target region is in some location outside of the paper roll dispenser (due to the door or panel being open). In some embodiments, it may not be necessary to measure the fourth distance. Rather, if a distance greater than the third distance is measured, this may be an indication that the door or panel is open and is not functioning as the target area for the time-of-flight sensor.

At block 550, calibration may be performed either locally by the PRSD or remotely by a server system for determining whether a door or panel of the paper roll dispenser is open or shut. The calibration performed at block 550 may use the third and fourth measurements taken at blocks 540 and 545 to determine a relationship between distances and whether the door or panel is open or shut. For instance, if a distance greater than the third distance is measured, it may be determined that the panel or door is open. In some embodiments, the door or panel is determined to be open when the same or a similar distance measurement the fourth distance measurement is measured. The calibration of block 550 may involve the third and fourth distances being transmitted to a remote server for storage or such distances being stored locally and associated with different door or panel states of the paper roll dispenser.

Figure 6:
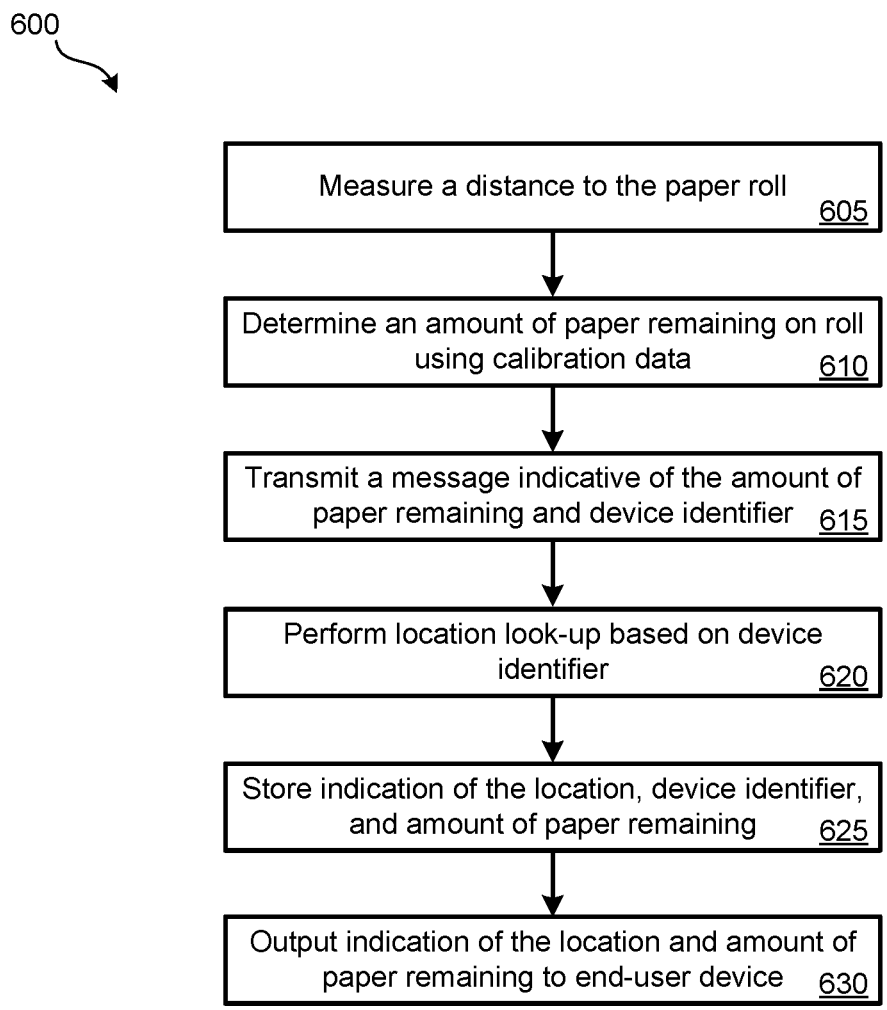
FIG. 6 illustrates an embodiment of a method for a paper roll sensing device reporting a state of a paper roll.

Following calibration being performed, another method may be performed to monitor the amount of paper remaining on a roll or for whether a paper roll needs replacing. FIG. 6 illustrates an embodiment of a method 600 for a paper roll sensing device reporting a state of a paper roll. Method 600 may be performed for a particular combination of a type, make, and/or model of a paper roll installed in a particular type, make, and/or model of a paper roll dispenser. Blocks of method 600 may be performed locally by a PRSD. In some embodiments, some blocks of method 600 may be performed using a remote server, such as server system 420 or cloud-based server system 450.

At block 605, occasionally or periodically, a PRSD may measure a distance using a time-of-flight sensor to an installed paper roll. Typically, the greater the distance, the less paper remaining on the paper roll at block 610, an amount of paper remaining on the role may be determined. This determination may be based on previously collected calibration data that indicates a distance expected to be measured when a paper roll is exhausted, exhausted to the point where a user desires the paper roll replaced, and/or full. In some embodiments, the distance measurement of block 605 is transmitted to a remote server system which may use the calibration data to perform block 610. In other embodiments, block 610 is performed locally by the PRSD.

If performed locally, at block 615, a message indicative of the amount of paper remaining and a device identifier of the PRSD may be transmitted to a remote server system. In some embodiments, the messages only transmitting if the paper roll needs replacing or the amount of paper presence is below a defined threshold. In some embodiments, rather than transmitting an indication of a specific amount of paper remaining, in indication as to whether a paper roll is in need of replacement may be transmitted. In such embodiments, the distance measurement of block 605 may be compared to a distance threshold stored by the PRSD. If the measure distances greater than the threshold, the message of block 615 may be transmitted. In other embodiments, the message is transmitted whether the paper roll needs replacement or not.

In response to receiving a message from the PRSD, the remote server may perform a lookup based on the received device identifier at block 620. Based on this received device identifier, the server may be able to determine a location that has previously been mapped to the device identifier. For example, in a large office building, a location such as "$2^{nd}$ dispenser in $27^{th}$ floor men's room" may be the location associated with a particular device identifier. Such a location may allow a janitor or facilities manager to easily determine which paper roll dispenser is in need of service. At block 625, the remote server may store, such as to a database, the indication of location, the device identifier, and/or the amount of paper remaining on the paper roll of the associated paper roll dispenser. In other embodiments, rather than indicating the amount of paper, in indication of whether or not the paper roll is in need of replacement may be stored.

At block 630, an indication of the location and, possibly, the amount of paper remaining in one or more paper roll dispensers may be output to an end-user device. In some embodiments, block 630 may be triggered by a paper roll being determined to be exhausted, nearly exhausted, or otherwise in need of replacement. In some embodiments, if a paper roll dispenser door or panel is determined to be open, an indication of such maybe output to the end-user device. In some embodiments, the indication output at block 630 is in response to inquiry performed by user using end-user device. In other embodiments, a user interface may be updated with indications of which, if any, paper rolls are in need of replacement and their associated locations.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A paper roll sensing device, comprising:
   a housing;
   a wireless transceiver located within the housing;
   a time-of-flight sensor, located within the housing, that measures a distance from the time-of-flight sensor to a target region;
   one or more processors, located within the housing that communicates with the wireless transceiver and the time-of-flight sensor; and
   a fastener that permits the housing to be attached to a location within a paper roll dispenser such that the time-of-flight sensor is pointed at a paper roll, wherein:
      the target region is a portion of the paper roll based on the location; and
      the fastener is positioned within the paper roll dispenser such that when less than a threshold amount of paper is present on the paper roll, the target region is a portion of an inner surface of the paper roll dispenser.

2. The paper roll sensing device of claim 1, wherein the one or more processors are configured to perform a calibration procedure that comprises the one or more processors being configured to:
   determine a first distance to a first paper roll based on a first distance measurement made using the time-of-flight sensor;
   determine a second distance to a second paper roll based on a second distance measurement made using the time-of-flight sensor, wherein the second paper roll has more paper attached than the first paper roll; and
   establish a calibration metric based on the first distance and/or the second distance.

3. The paper roll sensing device of claim 2, wherein a first amount of rolled paper on the first paper roll represents an amount of paper at which the one or more processors is to cause the wireless transceiver to transmit a notification of a paper roll replacement being needed to a cloud-based server system.

4. The paper roll sensing device of claim 2, wherein the one or more processors are further configured to:
   retrieve a device identifier of the paper roll sensing device;
   receive a distance measurement from the time-of-flight sensor;
   determine that the paper roll requires replacement based on the distance measurement and the calibration procedure; and
   cause the wireless transceiver to transmit an indication that the paper roll requires replacement and the device identifier.

5. The paper roll sensing device of claim 2, wherein the one or more processors are further configured to:
   retrieve a device identifier of the paper roll sensing device;
   receive a distance measurement from the time-of-flight sensor;
   determine an amount of dispensable paper remaining on the paper roll based on the distance measurement and the calibration procedure; and
   cause the wireless transceiver to transmit the amount and the device identifier.

6. The paper roll sensing device of claim 1, wherein the paper roll sensing device further comprises one or more processors configured to perform a calibration process comprising:
   measuring a closed-door distance to the portion of the inner surface of the door of the paper roll dispenser.

7. The paper roll sensing device of claim 6, wherein the paper roll sensing device further comprises one or more processors configured to:
   receive a distance measurement from the time-of-flight sensor;
   determine the distance measurement is greater than the closed-door distance; and
   cause the wireless transceiver to transmit an indication that the door is open and a device identifier to a remote server system.

8. The paper roll sensing device of claim 1 wherein the wireless transceiver is configured to communicate via a narrowband Internet of Things (NB-IoT) network.

9. The paper roll sensing device of claim 1 wherein the fastener is an adhesive.

10. A method for using a paper roll sensing device, the method comprising:
    fastening the paper roll sensing device within a paper roll dispenser such that a time-of-flight sensor is pointed at a paper roll, wherein
       the paper roll sensing device is fastened within the paper roll dispenser such that when less than a threshold amount of paper is present on the paper roll, the time of flight sensor is pointed at an inner surface of the paper roll dispenser;
    measuring, using the time-of-flight sensor of the paper roll sensing device, a distance from the time-of-flight sensor to a target region; and transmitting, using a wireless transceiver of the paper roll sensing device, an indication of an amount of paper remaining on the paper roll dispenser.

11. The method for using the paper roll sensing device of claim 10, the method further comprising:
performing, by the paper roll sensing device, a calibration process that comprises:
determining a first distance to a first paper roll based on a first distance measurement made using the time-of-flight sensor;
determining a second distance to a second paper roll based on a second distance measurement made using the time-of-flight sensor, wherein the second paper roll has more paper attached than the first paper roll; and
establishing a calibration metric based on the first distance and/or the second distance.

12. The method for using the paper roll sensing device of claim 11, wherein transmitting the indication of the amount of paper remaining on the paper roll dispenser is performed in response to the first distance of the calibration process or greater being measured.

13. The method for using the paper roll sensing device of claim 11, further comprising:
retrieving, by the paper roll sensing device, a device identifier of the paper roll sensing device;
receiving, by the paper roll sensing device, a distance measurement from the time-of-flight sensor;
determining, by the paper roll sensing device, that the paper roll requires replacement based on the distance measurement and the calibration process; and
causing, by the paper roll sensing device, the wireless transceiver to transmit an indication that the paper roll requires replacement and the device identifier.

14. The method for using the paper roll sensing device of claim 11, further comprising:
retrieving, by the paper roll sensing device, a device identifier of the paper roll sensing device;
receiving, by the paper roll sensing device, a distance measurement from the time-of-flight sensor;
determining, by the paper roll sensing device, an amount of dispensable paper remaining on the paper roll based on the distance measurement and the calibration process; and
causing, the wireless transceiver of the paper roll sensing device, to transmit an indication of the amount and the device identifier.

15. The method for using the paper roll sensing device of claim 10, the method further comprising:
measuring, by the paper roll sensing device, a closed-door distance to the portion of the inner surface of the door of the paper roll dispenser.

16. The method for using the paper roll sensing device of claim 15, further comprising:
measuring, by the paper roll sensing device, a distance measurement using the time-of-flight sensor;
determining, by the paper roll sensing device, the distance measurement is greater than the closed-door distance; and
causing, by the wireless transceiver of the paper roll sensing device, to transmit an indication that the door is open and a device identifier to a remote server system.

17. The method for using the paper roll sensing device of claim 10, wherein transmitting the indication of the amount of paper remaining on the paper roll dispenser is performed via a narrowband Internet of Things (NB-IoT) network.

18. The method for using the paper roll sensing device of claim 10 wherein fastening is performed using an adhesive.

* * * * *